United States Patent [19]

Moorman

[11] Patent Number: 5,041,911
[45] Date of Patent: Aug. 20, 1991

[54] EXPOSURE INFORMATION FEEDBACK IN ELECTRONIC AND/OR HYBRID FILM/ELECTRONIC CAMERAS

[75] Inventor: Michael C. Moorman, Rochester, N.Y.

[73] Assignee: Eastman Kodak Company, Rochester, N.Y.

[21] Appl. No.: 449,162

[22] Filed: Dec. 13, 1989

[51] Int. Cl.⁵ .................... H04N 5/30; H04N 5/225; H04N 1/46; G03B 17/18
[52] U.S. Cl. .................................. 358/209; 358/909; 358/81; 358/82; 354/465
[58] Field of Search ............... 358/209, 213.13, 909, 358/10, 81, 82; 354/465, 481, 471

[56] References Cited

U.S. PATENT DOCUMENTS

| | | | |
|---|---|---|---|
| 4,011,584 | 3/1977 | Puckett | 358/82 |
| 4,415,922 | 11/1983 | Reymond et al. | 358/81 |
| 4,704,632 | 11/1987 | Van Den Heuvel | 358/209 |
| 4,805,010 | 2/1989 | Shroyer et al. | 358/909 |
| 4,819,074 | 4/1989 | Suzuki | 358/213.13 |

Primary Examiner—James J. Groody
Assistant Examiner—Wendy R. Greening
Attorney, Agent, or Firm—Edward Dugas

[57] ABSTRACT

The invention is an exposure metering system particularly adapted for use with an electronic camera. The exposure meter is responsive to the electrical signals formed by the image capturing electronics of the camera. Using these electrical signals, a pseudocolored image is formed and displayed based on the exposure of individual image sub-areas. A full tonal original image may thus be modified to provide an image having zones each with one selectable tonal value. Each zone thus formed represents a range of tones appearing in the original image.

6 Claims, 2 Drawing Sheets

EXPOSURE INFORMATION FEEDBACK IN ELECTRONIC AND/OR HYBRID FILM/ELECTRONIC CAMERAS

FIELD OF THE INVENTION

This invention relates to the field of image processing and, more specifically, to a system which provides a photographer with information relating to the exposure and to the dynamic range of the image which he is photographing.

BACKGROUND OF THE INVENTION

All "photographic" systems are limited in terms of the amount of the dynamic range of the original scene that can be reproduced. In a conventional photographic system the limiting element is typically the reflection print. This is true to an even larger degree if the final output is not a silver halide print but rather is a half-tone newsprint. In an electronic camera system the limiting element could be the image sensor (whether it is a solid state imager or a pick-up tube), the recording process, or the display media which could be soft, i.e. CRT display, or some sort of reflection print.

It is the photographer's goal to reproduce an image which is representative of how he "visualized" the original scene Most "snapshot" photographers are content with a "good" exposure, i.e. flesh tones are reproduced satisfactorily. But one of the attributes of the professional photographer is his ability to look beyond the problem of getting a correct average exposure and to the problem of reproducing the full tonal range of the image that he is visualizing within the constraints of the photographic system which he is using.

Ansel Adams developed what is called the Zone System in order to aid the photographer with a practical approach for representing a range of subject luminances, at the wish of the photographer, by a range of tone (or color) values in the final output. (See *The Negative*, by Ansel Adams, A New York Graphics Society Book, Little Brown and Company, Boston, 1981.) The Zone System requires the photographer to mentally divide the subject that he is visualizing into a finite number of zones which represent finite tone differences which he is trying to achieve in the final output. Next the photographer must measure the reflectance of subject luminance of a representative number of these zones and calculate his photographic exposure in order to "place" what he considers the important zones at the proper exposure level. If the subject luminance range is greater (high contrast) or lower (low contrast) than what he is visualizing, then he can do one of several things. A few examples are: if he is using artificial light, he can modify the lighting set-up; if he is using a negative film, he can modify the development time to change the contrast; if he is using an electronic camera, he could use digital signal processing to do likewise. In U.S. Pat. No. 4,304,473, entitled "Automated Exposure-Contrast Control Index Meter" by J. S. Shreve there is contained a comprehensive description of the zone system.

The present invention may be used to provide the photographer with a tool to quickly and easily measure the exposure of each of the aforementioned zones simultaneously.

The preferred embodiment of the present invention is incorporated in a digital, color electronic still camera system which includes a color display. In this embodiment, shortly after the subject is photographed, the captured image is displayed using pseudo-color techniques to represent the various "zones".

The present invention may be applied to a variety of types of photographic systems. Two examples are:

1. Hybrid film/electronic cameras of the type described in U.S. patent application Ser. No. 288,887, filed on Dec. 23, 1998 and entitled "Camera" by C. Bell, et al.
2. Cameras of the type described in U.S. Pat. No. 4,837,628, entitled "Electronic Still Camera for Recording Still Picture On Memory Card With Mode Selecting Switch" by M Sasaki.

What these two systems have in common is their ability to electronically capture an image, process it, and display it on a display device. The present invention may be incorporated on any system that incorporates these functions.

An exposure meter which provides the photographer with an indication of the distribution of luminance values over a field of view is described in U.S. Pat. No. 4,671,655, entitled "Exposure Meter" by M. C. Heard. The present invention is a significant improvement over this invention in that it will provide the photographer with exposure information on a point-to-point basis within the image.

SUMMARY OF THE INVENTION

The preferred embodiment of the present invention is comprised of an exposure metering system having an area type image sensor, such as an interline CCD or Vidicon pick-up tube, a means for controlling the exposure on the sensor, which is comprised of an aperture and an electronic and/or mechanical shutter, a signal processing circuit for convert in the signal from a sensor to a signal suitable for sending to the display as well as for converting the signal from a more continuous representation of tones to one where the tone scale is divided into a finite number of steps, and a display for displaying the captured processed image This division of the tonal range into a finite number of steps may be done in a number of ways for various applications. One way is for each step to represent a change of 1 stop of effective exposure. Another is for each step to represent a doubling in density on whatever the final output media that the particular photographer is using. In this case a switch is used to select different mappings corresponding to different output media. A third choice would be a simpler embodiment wherein image subareas, or pixels, of the image which are either severely underexposed or overexposed (outside of the dynamic range of the photographic system being used) are displayed as a different tone or color from the rest of the image. Regardless of the particular mapping chosen, each pixel would be mapped into the step for which it has the closest value. In addition, if a color display is used then a pseudo-color mapping can be performed in order to better differentiate between the progressive steps.

From the foregoing it can be seen that it is a primary object of the present invention to form a system for providing information relating to the exposure and the dynamic range of an image being photographed.

It is another object of the present invention to provide a system for quickly and easily measuring and indicating the exposure of a plurality of subareas.

The above and other objects of the present invention will become more apparent when taken in conjunction with the following description and drawings wherein like characters indicate like parts and which drawings form a part of the present invention.

DESCRIPTION OF THE PREFERRED EMBODIMENT

An exposure metering system according to this invention will be described as a feature to an electronic still camera system. As was described in the background to the invention, this is only one possible system configuration.

Figure 1:
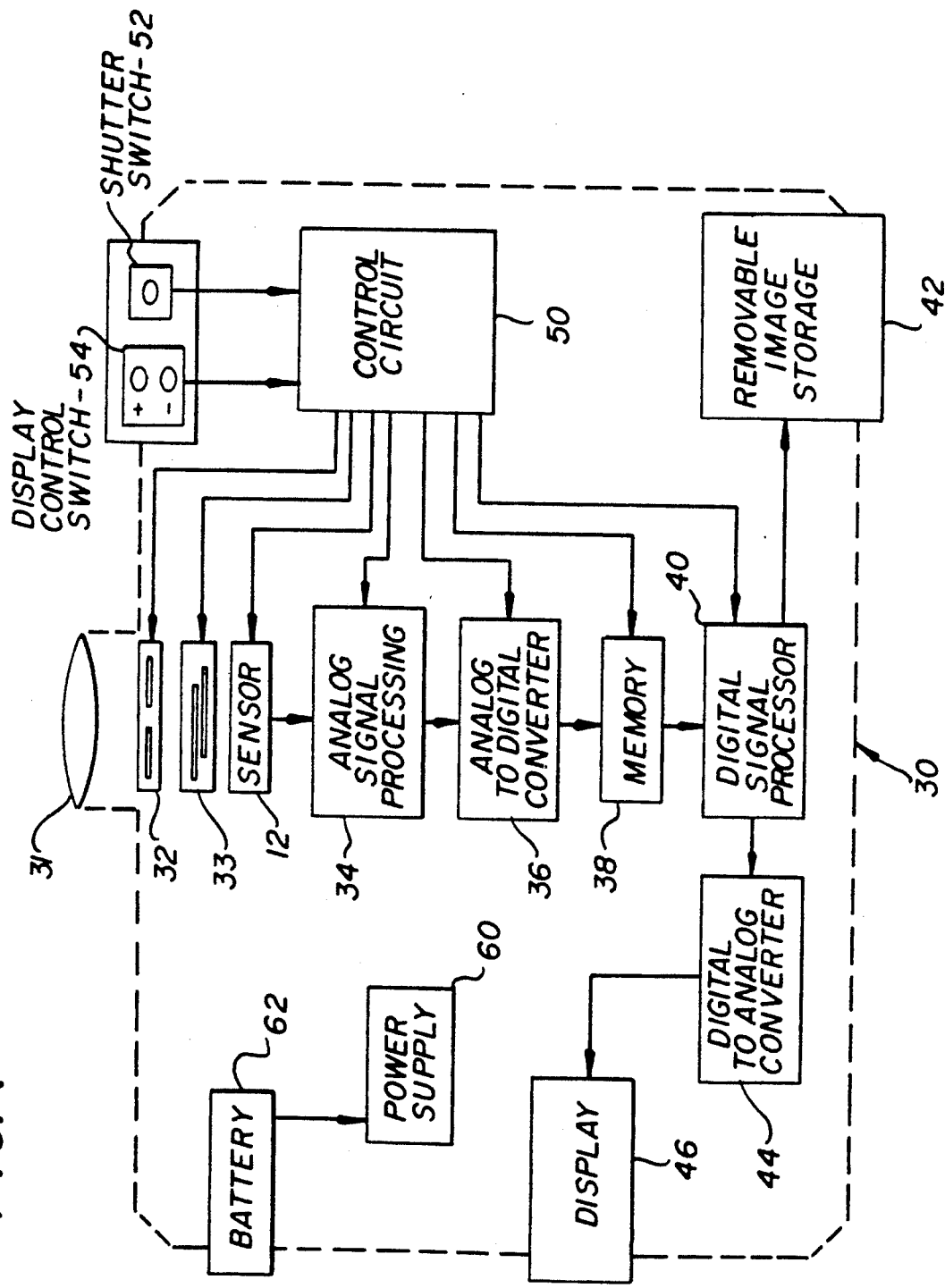
FIG. 1 illustrates in block diagram form a preferred embodiment of the invention.
Figure 2:
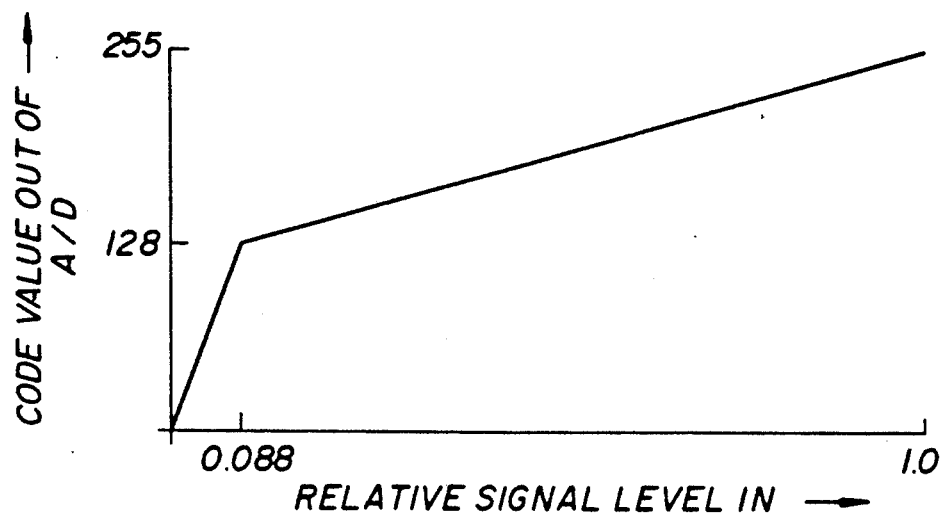
FIG. 2 illustrates the transfer function of a non-linear compander used in one of the blocks of FIG. 1.

Referring now to FIG. 1 which is a schematic representation of an electronic still camera 30 which incorporates the present invention. The camera 30 has a CCD area image sensor 12 onto which a scene is imaged. In the preferred embodiment the CCD image sensor 12 is a Kodak KAF1400 Area Array with 1.4 million pixels. The signal from the CCD sensor 12 is processed by an analog signal processing block 34. The processing block 34 performs the functions of: sampling the CCD output signal, black level clamping, gain, and non-linear companding. The non-linear companding is a single breakpoint piecewise linear curve shaper whose transfer function is illustrated in FIG. 2. This companding is accomplished by adjusting the voltage at the center tap of the A/D reference ladder to 0.088 times the voltage of the top of the A/D reference ladder. The output signal from the processing block 34 is then converted to a digital signal, represented by code values ranging from 0 to 255, by an A/D converter 36, which digital signal is temporarily stored in a memory 38. The camera is calibrated by adjusting the analog gain such that a properly exposed average exposure corresponds to a code value of 128 at the output of the A/D. The digital signals, read from the memory 38, under control of a control circuit 50, are directed to a digital signal processor 40. The output signals from the digital signal processor 40 are directed to a removable image storage device 42 and to a digital to analog converter circuit 44. The analog output from 44 is directed to a display device 46.

A shutter 33 is positioned between an aperture 32 and the image sensor 12. The shutter 33 is controlled by the control circuit 50. The control circuit 50 also receives commands from a shutter switch 52 and a display control switch 54, both under operator control. A power supply 60 is coupled to each of the circuit blocks shown to provide operating power. A battery 62 is the source for power supply 62.

The shutter switch 52 operates the camera functions in the manner described in U.S. Pat. No. 4,837,628 as well as to initiate input to output mapping.

The digital signal processor 40 receives the digital code values from the memory 38. Under the control of the control circuit 50 the input digital code values are mapped to RGB output code values. This assignment or mapping first checks to see which "bin" the particular input code value falls into and then assigns one of a finite number of red, green, and blue code values. This mapping is described in the following table.

| INPUT C.V. RANGE | | Input Code Value Mapping: CODE VALUES | | | COLOR | ZONE |
|---|---|---|---|---|---|---|
| | | RED | GREEN | BLUE | | |
| — | <11 | 0 | 0 | 0 | Black | I |
| ≧11 | <23 | 0 | 0 | 128 | Blue | II |
| ≧23 | <45 | 100 | 0 | 100 | Dark Magenta | III |
| ≧45 | <90 | 128 | 90 | 100 | Dark Flesh | IV |
| ≧90 | <133 | 128 | 128 | 128 | Gray | V |
| ≧133 | <151 | 210 | 160 | 128 | Light Flesh | VI |
| ≧151 | <186 | 255 | 180 | 255 | Light Magenta | VII |
| ≧186 | <255 | 255 | 255 | 0 | Yellow | VIII |
| =255 | — | 255 | 255 | 255 | White | IX |

The table represents a mapping for a system based on a normal exposure for EI 100 speed based on the ANSI standard for exposure meters ("American National Standard for General Purpose Exposure Meters(-Photoelectric Type)," New York, American National Standards Institute, PH3,49-1971). A scaled mapping would be required for different system speed settings.

In Appendix A a FORTRAN program listing is included for implementing the mapping on a Sun Microsystems computer which computer was connected to a research prototype electronic still camera. This code represents a higher level description of the software in the digital signal processor.

The RGB code values from the digital signal processor 40 are then converted into an analog signal by the D/A converter 44 for display by display device 46, or they are kept in the digital form for storage in the removable image storage device 42.

The display control switch 54 operates to select a different input to output code value mapping. By means of + and − switches, the photographer is able to modify the mapping that corresponds to the dynamic range of different output media. Each + or − increment corresponds to an addition or a reduction of one doubling in the density range of the output media which also corresponds to a change of one Zone in the original scene. In order for the camera to let the photographer know how many "zones" the original image is being mapped into a numeral is displayed on the display 46 by means of the control circuit 50 instructing the digital signal processor to output specific code values to the A/D 36. For instance, if the photographer instructs the camera, by means of + and − switches, that he is only interested in 5 zones than the following mapping would be used.

| INPUT C.V. RANGE | | Input Code Value Mapping: OUTPUT CODE VALUES | | | COLOR | ZONE |
|---|---|---|---|---|---|---|
| | | RED | GREEN | BLUE | | |
| — | <45 | 0 | 0 | 0 | Black | III |
| ≧45 | <90 | 128 | 90 | 100 | Dark Flesh | IV |
| ≧90 | <133 | 128 | 128 | 128 | Gray | V |
| ≧133 | <151 | 210 | 160 | 128 | Light Flesh | VI |
| ≧151 | — | 255 | 255 | 255 | White | VII |

The pseudo colored image that results from this mapping along with the numeral indicating the number of zones being displayed, is then converted to an analog RGB signal and is displayed on the display device 46.

For this embodiment, the display device 46 could either be a color CRT or a color LCD display.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

I claim:

1. An electronic still camera combination:
   an optical system mounted in said camera for focusing an image;
   an image sensing means within said camera for receiving said focused image and for converting the pixel values of said focused image to electrical signals;
   an exposure means within said camera for receiving said electrical signals, said exposure means incorporating a means for mapping said electrical signals into a desired metric for display according to the exposure of individual pixel values of said focused image, said metric comprises of at least two distinct color or tone zones which represent stop exposure differences within a range of photographic interest in the image; and
   means for displaying said mapped electrical signals.

2. The electronic camera according to claim 1 wherein groups of pixel values, representing areas, of said focused image are mapped by said exposure means.

3. An exposure meter comprising:
   a) image sensing means for receiving an image and for converting said image to electrical signals;
   b) means for mapping said electrical signals into a desired metric for display according to the exposure of each individual image sub-area, said metric comprised of at least two distinct colors or tones wherein each tone or color represents one stop (i.e., a doubling) difference in exposure; and
   c) means for displaying said mapped electrical signals.

4. An exposure meter according to claim 3 and further comprising;
   an electronic still camera coupled to said exposure meter.

5. The exposure meter according to claim 3 and further comprising:
   operator selection means, operatively coupled to said means for mapping for modifying the mapping of said electrical signals into a finite number of tones or colors.

6. The exposure meter according to claim 5 and further comprising:
   means for causing a numerical indication of the finite number of tones or colors to be displayed by said means for displaying.

* * * * *